(12) United States Patent
Robinson et al.

(10) Patent No.: US 8,228,912 B2
(45) Date of Patent: Jul. 24, 2012

(54) SELECTING WIRELESS MESH NODE LOCATIONS

(75) Inventors: Joshua P. Robinson, Houston, TX (US); Mustafa Uysal, Fremont, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 12/433,807

(22) Filed: Apr. 30, 2009

(65) Prior Publication Data

US 2010/0278072 A1 Nov. 4, 2010

(51) Int. Cl.
*H04L 12/28* (2006.01)
*H04L 12/56* (2006.01)
*H04L 12/66* (2006.01)
*H04L 12/50* (2006.01)
*H04L 12/54* (2006.01)

(52) U.S. Cl. ........ 370/389; 370/351; 370/370; 370/352; 370/392; 370/395.32

(58) Field of Classification Search .................. 370/254, 370/400, 389, 351, 352, 356, 392, 395.32, 370/409, 241, 252, 310, 345, 39
See application file for complete search history.

(56) References Cited

U.S. PATENT DOCUMENTS

2009/0222782 A1* 9/2009 Bayati et al. ...................... 716/7

OTHER PUBLICATIONS

Karrer, R. et al., "Enabling Large-scale Wireless Broadband: The Case for TAPs", Proceedings of HotNets-II, Cambridge, MA, Nov. 2003, p. 1-6.
Camp, J. et al., "Measurement Driven Deployment of a TwoTier Urban Mesh Access Network", Proceedings of ACM MobiSys, Jun. 2006, p. 1-14.
Aguayo, D. et al. "Link-level Measurements from an 802.11b Mesh Network", Proceedings of ACM SIGCOMM, Portland, OR, 2004, p. 1-11.
Lee, Y. et al., "Optimization of AP Placement and Channel Assignment in Wireless LANs", IEEE Conference on Local Computer Networks, Nov. 2002, p. 1-6.
Lloyd, E. L. et al., "Relay Node Placement in Wireless Sensor Networks", IEEE Transactions on Computing, vol. 56, No. 1, 2007, p. 1-17.
Srinivas, A. et al., "Mobile Backbone Networks Construction and Maintenance", ACM MobiHoc, May 2006, p. 1-12.
Robins. G. et al., "Improved Steiner Tree Approximation in Graphs", Symposium on Discrete Algorithms, 2000, p. 1-11.
Robins. G. et al., "Tighter Bounds for Graph Steiner Tree Approximation", SIAM Journal on Discrete Mathematics, 2005, p. 122-134.
Drake. D. et al., "On Approximation Algorithms for the Terminal Steiner Tree Problem", Information Processing Letters, 2004, p. 1-6.
Amaldi, E. et al., "Optimization Models for the Radio Planning of Wireless Mesh Networks", IFIP Networking, May 2007, p. 1-12.
"Five Keys to Successful Metro-Scale Wi-Fi Deployment", Tropos Networks White Paper, Dec. 2004, p. 1-5.

\* cited by examiner

*Primary Examiner* — Kwang B. Yao
*Assistant Examiner* — Adam Duda

(57) ABSTRACT

Locations for deploying mesh nodes in a wireless network are determined based on a Terminal Steiner tree (TST). The TST that is formulated from an input graph and client locations in the wireless network is determined. The input graph includes signal strength values for pairs of mesh node-to-client location and mesh node-to-mesh node links and mesh node locations for deploying the mesh nodes are selected from the Steiner nodes in the TST.

19 Claims, 5 Drawing Sheets

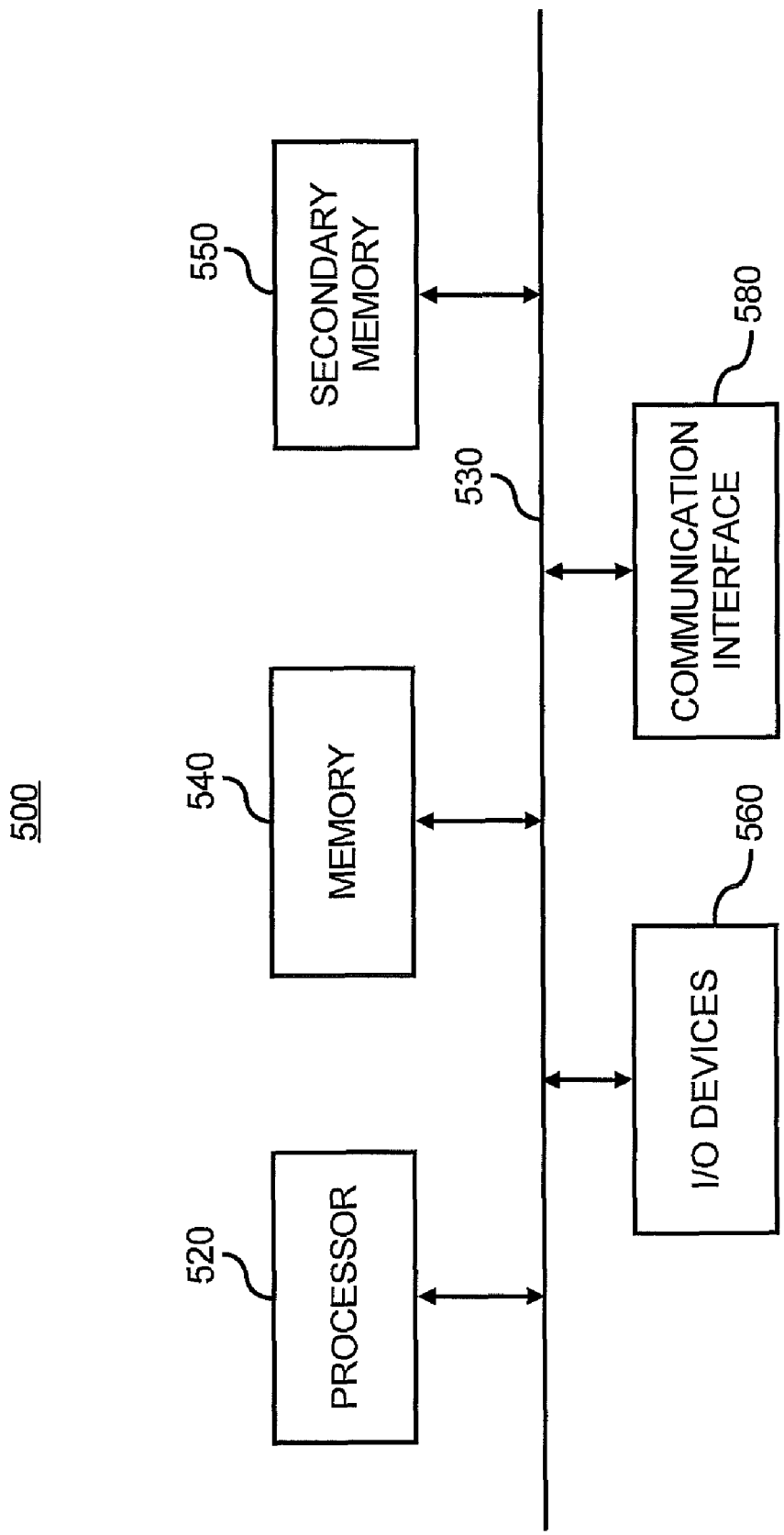

SELECTING WIRELESS MESH NODE LOCATIONS

RELATED APPLICATIONS

The present application is related to U.S. patent application Ser. No. 12/419,633, entitled "Location Determination for Placing a New Capacity Point in a Wireless Network", by Joshua P. Robinson, Mustafa Uysal, and Ram Swaminathan; and U.S. patent application Ser. No. 12/433,717, entitled "Determining a Metric Region in a Wireless Network", by Joshua P. Robinson and Ram Swaminathan, all of which are incorporated by reference in their entireties.

BACKGROUND

Wireless mesh network deployments are popular as a cost-effective means to provide broadband connectivity to large user populations. For instance, wireless mesh networks are being deployed in many cities in order to provide ubiquitous Internet access. Thus, wireless mesh networks provide city-wide wireless coverage through the careful deployment of mesh nodes. Each node provides coverage to a nearby region, while using multi-hop transmission to connect to an Internet gateway node. Multi-hop means that a signal can move from mesh node-to-mesh node and then finally to the Internet gateway node rather than from the user directly to the gateway node. A mesh network's gateway nodes that connect the wireless mesh network with the wired Internet are critical capacity points as their location and quantity determine the maximum throughput supported by the mesh network.

Selecting optimal install locations of mesh nodes is difficult. One of the challenges is that a mesh node location must jointly satisfy connectivity and coverage constraints. Connectivity means that mesh nodes are interconnected to communicate with each other, and coverage means that a client can connect to a mesh node in a target area. A connectivity constraint may be that each mesh node is required to be connected directly (e.g., via one hop) or indirectly (e.g., via multi-hops) with every other mesh node in the mesh network. A coverage constraint may be a signal strength requirement for a client in any location within a target geographic area. In addition to having to meet constraints when selecting mesh node locations, there may be a very large number of potential mesh node locations to choose. If testing is performed at every location to determine whether constraints are satisfied, deployment costs may increase.

BRIEF DESCRIPTION OF THE DRAWINGS

Features of the present invention will become apparent to those skilled in the art from the following description with reference to the figures, in which:

FIG. 5 shows a block diagram of a computer system that may be used as a platform for devices shown in FIG. 1, according to an embodiment of the present invention.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Mesh networking includes a way to route data between nodes. A mesh node is an electronic device with a network interface that is capable of sending or receiving data via the network. Mesh networking allows for continuous connections and reconfiguration around broken or blocked paths by "hopping" from one node to another node until the destination is reached. When nodes are all connected to each other in a mesh network, it is a fully connected network. Mesh networks differ from other networks because the mesh nodes can all connect to each other via multiple hops, and they generally are not mobile. Other nodes in the mesh network may be mobile, such as mobile user devices including cell phones, laptops, etc. Mesh networks are self-healing in that the network can still operate even when a node breaks down or a connection goes bad. As a result, mesh networks are very reliable. A mesh network may include wired and wireless nodes. Thus, a mesh network may include both wireless network and wired network. Also, wireless mesh networks provide coverage in a target area, such as in a section of a city, in a building, etc.

Figure 1:
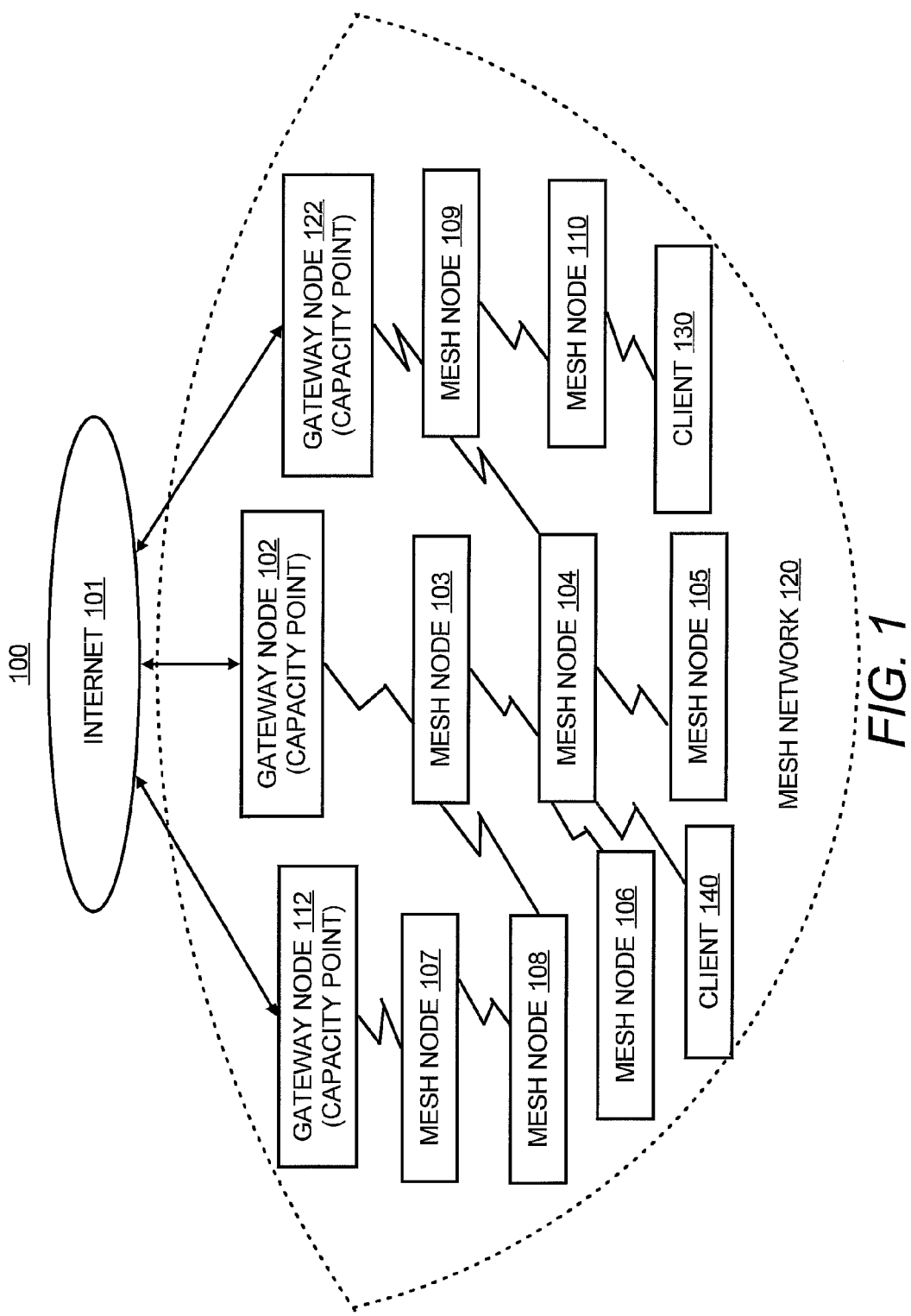
FIG. 1 shows a simplified block diagram of a system including a wireless mesh network, according to an embodiment of the present invention.

FIG. 1 illustrates a block diagram of a system 100 including a wireless mesh network 120, according to an embodiment of the present invention. The system 100 includes Internet 101 and the wireless mesh network 120. The wireless mesh network 120 may be connected to an access network or any wide area network (WAN) or other network, and not just the Internet.

The wireless mesh network 120 includes multiple nodes, shown as mesh nodes 103-110 and gateway nodes 102, 112, and 122. The gateway nodes 102, 112, and 122 are also referred to as capacity points because they provide the throughput or available bandwidth to the Internet. The gateway nodes 102, 112, and 122 are network nodes equipped for interfacing with another network outside the wireless mesh network 120 that may use different protocols. The wireless mesh network 120 also includes a client 130. In FIG. 1, the mesh nodes 103-110 are wirelessly connected to one or more other mesh node and to at least one gateway node directly or via multiple hops. The client 130 may be connected to the Internet 101 via the mesh nodes 109 and 110, and the gateway node 122.

Selecting mesh node locations is difficult because of coverage and connectivity constraints, as well as unpredictable physical layer link behavior. An embodiment of the present invention provides a method for selecting wireless mesh node locations for deploying wireless mesh nodes in a wireless network with a general physical layer that includes measurement information.

In an embodiment of the present invention, the selection of mesh node locations to satisfy coverage and/or other constraints is viewed as a mesh node placement (MNP) problem.

The solution to the MNP problem is constrained to a finite set of potential installation locations, accepts arbitrary signal strength estimates between client locations and potential mesh nodes, and satisfies both coverage (client location-to-mesh node) and connectivity (mesh node-to-mesh node) performance constraints. Generally, signal strength refers to the magnitude of the electric field at a reference point that is a significant distance from the transmitting antenna. Here, it may also be referred to as received signal level or field strength between client locations and potential mesh nodes.

According to an embodiment, the MNP problem is modeled as an instance of the NP-hard Steiner tree problem, and the modeled MNP problem is referred to as the Terminal Steiner tree (TST) problem. The Steiner tree problem is a known technique for solving an optimization problem. The Steiner tree problem and the TST problem are described in further detail below.

Using the TST problem to determine potential mesh node locations results in a constant-factor approximation for the optimal solution. In addition, single-user performance metrics, such as cost, link quality, redundancy, contention, and confidence in measurements are defined. Contention is used as a simplification of interference, as situations in which a node is forced to defer due to either concurrent transmission or interference are concerned.

The Steiner tree problem is the following: given a set of points for vertices, interconnect them by a network of shortest length, where the length is the sum of the lengths of all edges. In the Steiner tree problem, extra intermediate vertices and edges may be added to the graph in order to reduce the length of the spanning tree. These new vertices introduced to decrease the total length of connection are known as Steiner points or Steiner vertices. It has been proved that the resulting connection is a tree, known as the Steiner tree. There may be several Steiner trees for a given set of initial vertices.

As indicated above, according to an embodiment, the MNP problem is modeled as an instance of the Steiner tree problem, and the modeled MNP problem is referred to as the TST problem. Formulating the TST problem to solve the MNP problem involves the construction of a Steiner tree over a full graph of client locations and potential mesh node locations. This Steiner tree is referred to as the TST. The client locations are locations in the target coverage area for the mesh network where the client can be located and the metrics are achieved at that location, such as predetermined signal strength between a mesh node and the client. Steiner nodes in the TST correspond to the potential mesh node locations. Client locations are not required to relay traffic by removing all client-to-client links in the graph. The input graph then consists of signal strength values for all pairs of mesh node-to-client location and mesh node-to-mesh node links, allowing for non-circular transmission ranges. This process allows building a network with a minimum cost, i.e., the minimum number of deployed mesh nodes.

Once the TST is created, then, as described above, each of the Steiner nodes represents a potential mesh node location. Thus, the TST is generated, and from the TST the potential mesh node locations are determined. The final mesh node locations (i.e., the mesh node locations that are used as the locations for deploying mesh nodes) are selected from the potential mesh node locations. The final mesh node locations may be selected to optimize one or more metrics, such as maximizing signal strength, minimizing contention, provide redundancy, and maximizing confidence in link estimates and measurements.

There are a variety of different objectives that this TST framework can solve for. One example is to iteratively refine the input graph using a small number of measurements. Another possibility is to minimize contention using contention-based edge weights in the graph. Redundancy can be also be achieved by re-running the process on the modified input and union the results. Maximizing confidence in the link estimates is another objective that this TST framework can solve for.

The following discusses how the TST problem is formulated from the MNP problem. The MNP problem takes as input a connectivity matrix that is used to build the TST. This matrix consists of all mesh nodes that may be deployed for the mesh network and all client locations. Assume that population density has influenced the density of the discrete client locations. To preserve the mesh backhaul properties, all links between two client locations are removed. An example of an input for the mesh node locations is to grab the set of all city-owned light poles. Also, assume an input connectivity matrix which gives a signal strength value for each client location to each potential mesh node location and for all pair wise combinations of potential mesh node locations. By allowing each link's signal strength to be specified uniquely, a general physical layer model which can be a mix of estimation and measurement values are considered. The network designer may take an exhaustive set of measurements and input this data into the process, or estimate the values using a sophisticated terrain-informed estimation model. When no other possible terrain information is available, simple circular range models and path loss equations could be used. Realistically, a mixture where some links are measured and others are estimated with more sophisticated models are expected as input.

First, the notation for the MNP problem is presented. The value $K[i,j]$ represents the estimated signal strength between potential mesh node locations i and j. Similarly, the value $L[i,j]$ represents the estimated signal strength between potential mesh node location i and client location j. Further, the input requires two additional variables k* and l* for the thresholds to determine if a mesh-to-mesh or a mesh-to-client link satisfies performance bounds. Let M be the set of potential mesh node locations and C the set of client locations.

According to an embodiment of the present invention, a valid solution to the MNP problem is a subset of potential mesh node locations, P, at which to install mesh nodes. If connectivity and coverage constraints need to be satisfied, the solution set P should obey the following connectivity and coverage constraints: The undirected graph derived from vertices in P is connected, where all edges $e_{i,j} \in \{P\}$ satisfy $K[i,j] \geq k^*$. $L[i,j] \geq l^*$, $\forall i \in C$, $\exists j \in P$, where C is the set of client locations and P is the subset of potential mesh node locations, at which to install mesh nodes.

The TST and how the MNP problem is mapped to the construction of an optimal TST with client locations as terminal vertices and mesh nodes as Steiner points are described next.

A minimum Steiner tree is a minimum weight tree that spans all nodes, with the potential addition of extra nodes, termed Steiner points, to reduce the total weight. Steiner trees are considered in graphs and Steiner points are restricted to a predefined set of nodes. A TST is a minimum weight Steiner tree where all the non-Steiner points are leafs of the tree.

Figure 2:
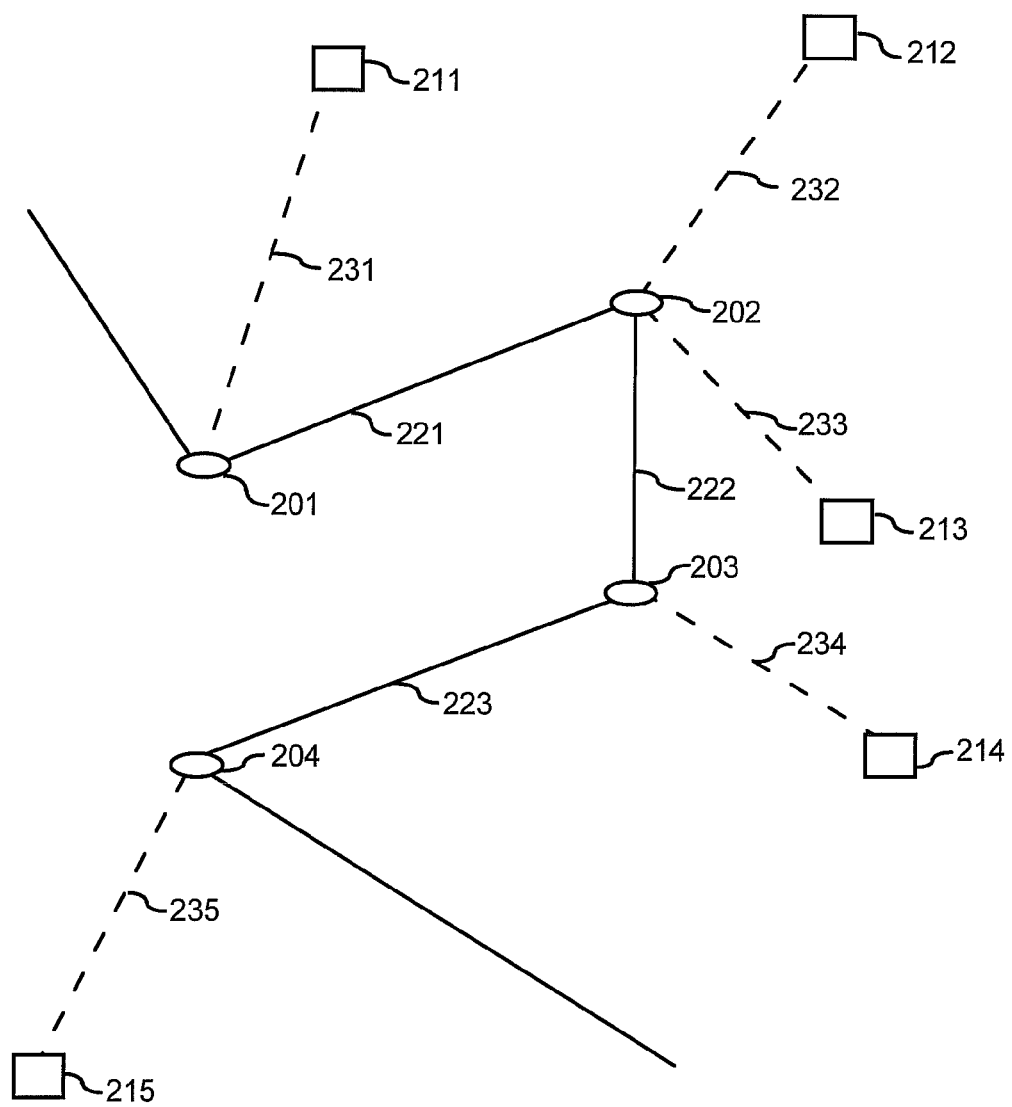
FIG. 2 shows a simplified diagram of a Terminal Steiner tree (TST), according to an embodiment of the present invention.

FIG. 2 shows a simplified diagram of a TST 200, according to an embodiment of the present invention. The TST 200 includes Steiner points 201-204 that can be used for mesh nodes and client location points 211-215. Links 221-223 are the links between two Steiner Points, and links 231-235 are the links between a client location and a Steiner Point. Note that to jointly consider connectivity and coverage in the TST, each client location has to be connected to a mesh node and no client locations are required to forward traffic for other client locations.

Figure 3:
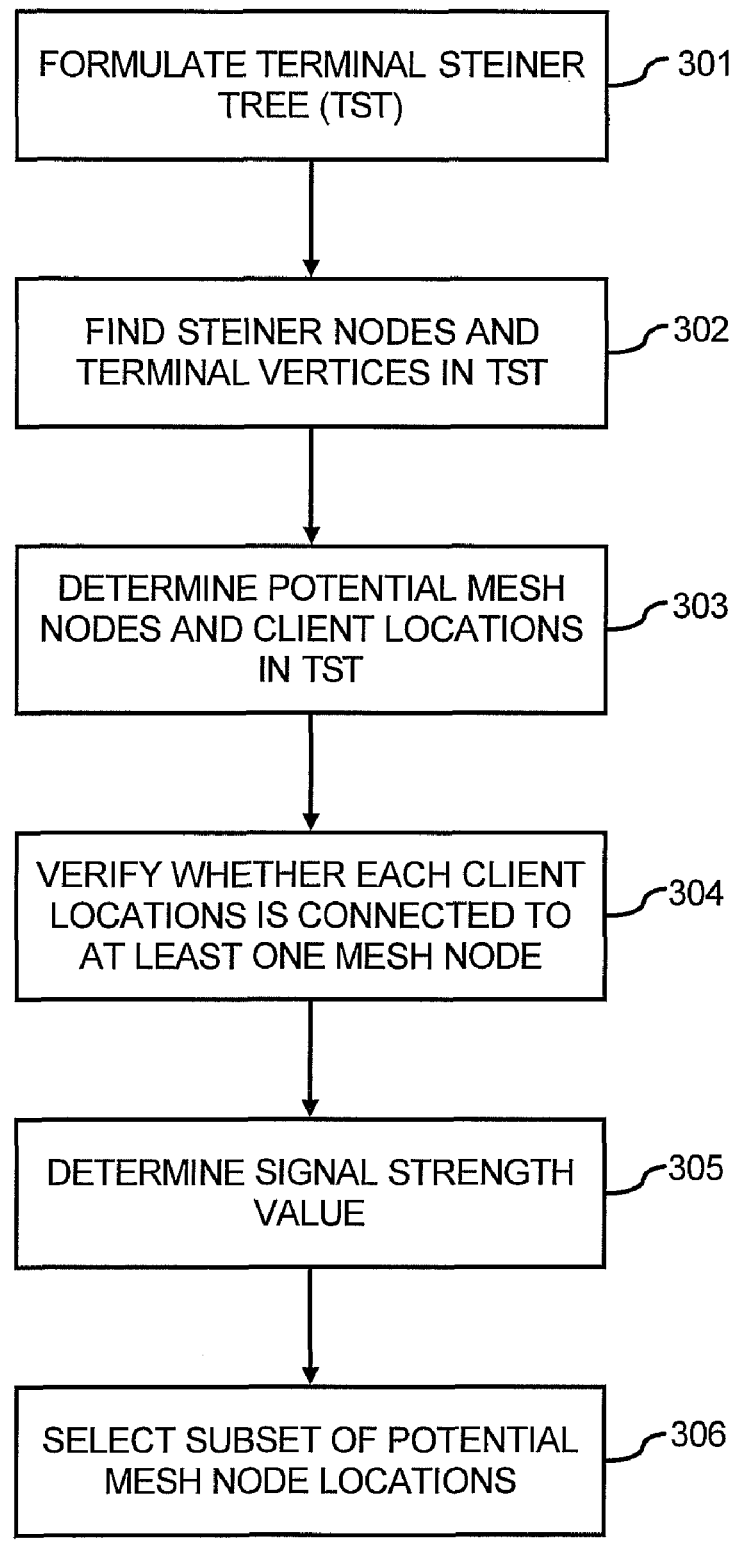
FIG. 3 illustrates a flowchart of a method for selecting wireless mesh node locations for deploying wireless mesh nodes in a wireless network, according to an embodiment of the present invention.

An embodiment of a method in which the TST 200 shown in FIG. 2 may be employed for selecting a wireless mesh node location for deploying wireless mesh node in a wireless network is described with respect to the following flow diagram of the method 300 depicted in FIG. 3. It should be apparent to those of ordinary skill in the art that the method 300 and the other methods described herein represent a generalized illustration and that other steps may be added or existing steps may be removed, modified or rearranged without departing from the scopes of the methods. Also, the methods are described with respect to the mesh network of FIG. 1 and the TST of FIG. 2 by way of example and not limitation, and the methods may be used in other systems or other types of networks, wired or wireless.

FIG. 3 illustrates a flowchart of a method for selecting wireless mesh node locations for deploying wireless mesh nodes in a wireless network, according to an embodiment of the present invention.

At step 301, a TST is formulated from a Steiner Tree and client locations in a wireless network, such as the mesh network 100 shown in FIG. 1. As described above, formulating the TST problem involves the construction of a Steiner tree over a full input graph of client locations and potential mesh node locations. This Steiner tree is referred to as the TST. The TST includes Steiner nodes, terminal vertices, and signal strength values. As described above, the Steiner nodes in the TST represent the potential mesh node locations. The terminal vertices of the TST correspond to the client locations. The signal strength values are for pairs of mesh node-to-client location and for pairs of mesh node-to-mesh node. At step 302, Steiner nodes and terminal vertices in the TST are found. At step 303, potential mesh node locations are input to the problem and could be determined from the Steiner nodes in the TST. Also client locations are determined from the terminal vertices in the TST. At step 304, to select the mesh node locations from the potential mesh node locations, whether the each of the client locations is connected to at least one mesh node location are verified. At step 305, arbitrary signal strength values between client locations and potential mesh nodes are selected from the signal strength values of the TST. Finally, at step 306, selects a subset of the potential mesh node locations from the Steiner nodes in the TST based on the arbitrary signal strength values and connectivity and coverage constraints to deploy the mesh node. Here, the location is a geographical location in the mesh network. The mesh network includes a wireless network and the location is a geographic location in the wireless network. Buildings, landscape and other factors may cause one location to be better than another.

Optimizations to the process based on the TST, according to an embodiment of the present invention are described next. In addition to minimizing the number of mesh nodes, signal strength, redundancy, contention, and measurement confidence are optimized for selecting wireless mesh node locations using the TST, according to an embodiment of the present invention.

Maximizing link weights will result in the TST process deploying far too many mesh nodes, but there is not a version of the Steiner tree problem with a constraint on the number of Steiner Points that has a constant factor approximation ratio. The Connected Facility Location (CFL) problem is related, but requires an assignment of cost to the mesh nodes, which cannot be directly compared with the link weights. In other words, there is no natural way to compare cost of mesh nodes with link weights in signal strength (dB).

The method, according to an embodiment of the present invention is to iteratively increase the signal strength thresholds, k* and l*, until it cannot deploy a network that obeys the given budget constraint. This process still runs in polynomial time because the range of valid values for k* and l* is restricted and whole number threshold values are only considered for the iteration process.

The process is modified to provide k-redundancy to the client locations so that each client location has connectivity to k mesh nodes. Even if k−1 mesh nodes fail, all client locations will remain able to use the mesh network, according to an embodiment of the present invention.

For the 2-redundancy process, it is required that two runs of the TST approximation process. After the first iteration, all client locations that already have 2-connectivity are identified and removed from the graph. That is, those client locations for which two links have signal strength that meets or exceeds the threshold l*. For those client locations with only one mesh node connection meeting the threshold l*, this client link above the threshold is removed from the graph. Then run a second iteration of the TST process on the modified graph, forcing the client locations to connect via another one of their potential links. Next, union the two resulting Steiner trees to come up with the mesh placement that ensures each client location can connect to two different mesh nodes.

A process extension that minimizes the total contention in the network, according to an embodiment of the present invention, is described next. Contention is defined as the average number of mesh nodes within contention range of a client location or is defined as a weight on each link. The TST will then solve to find the minimum total weight in the network. In one embodiment, it is focused on the contention on client nodes.

In another embodiment, contention is defined as the inability of a node to transmit successfully if a contending link is also currently active, i.e., if either endpoint of that link causes link errors or deferral in transmission. For simplicity, the input connectivity matrix is set equivalent to the contention matrix. Contention range may be closer approximated as interference and therefore be larger than transmission range. In the contention graph, an edge exists between two nodes if transmission from one prevents the other from successfully decoding a packet.

For the links between two potential mesh node locations, the link weight is the number of client locations within contention range of either end of the link. It can be shown that this assignment of link weights based on contention preserves the triangle inequality, which is needed for the Steiner tree processes. Consider a triangle of three mesh node locations, a, b, and c, and the resulting three links between them, labeled AB, AC, and BC. The contention caused by link AB is less than the sum of the contention of links AC and BC for the following reason. Let i( ) represent the set of nodes in contention with a node or contention range of nodes a and b, resulting in $i(AB)=i(a)\cup i(b)$. The contention caused by links AC and BC is $|(i(a)\cup i(c))|+|(i(b)\cup i(c))|$ and is smallest when node c contends with no mesh nodes. Therefore, the contention is lower-bounded by $|i(a)|+|i(b)|$, which is greater than or equal to $|i(AB)|$, ensuring that the triangle inequality is preserved.

A modification of the process that takes into account the estimation process for the physical layer signal strengths and integrating measurements into the process is described next, according to an embodiment of the present invention. In a realistic setting, the entire input matrix K and L are not practical to obtain via measurements. To find a good deployment with few measurements, the Steiner tree selection is iteratively refined by measuring the chosen links in the Steiner tree to valid the previous estimate. This process can quickly find a valid Steiner tree, when the entire backhaul link's signal strength is known, to ensure that the deployed network will meet performance goals. At each iteration, the parts of the original Steiner tree that were measured as high quality will be kept and the links measured as poor quality will be replaced.

The initial run of the TST process takes as inputs an estimation for all the links in the network. The resulting Steiner tree highlights the links that the process chose to ensure connectivity so that the links can be measured first. After this, use these backhaul measurements to rerun the process. This second run will take into account the measurements and come up with an improved placement. The input graph for the second run is adjusted as follows. For the links, which are measured to be unacceptably poor quality, remove them from the connectivity graph. For the links, which are measured as high quality, modify the link weight to favor those links, which are already known to be good. To do this, modify the weights on these links to $(1-\epsilon)$. This process can favor the links that are more confident in when a tie-break situation arises. This gives the desirable property that the process does not change the relative importance it gives to client location and backhaul links.

Figure 4:
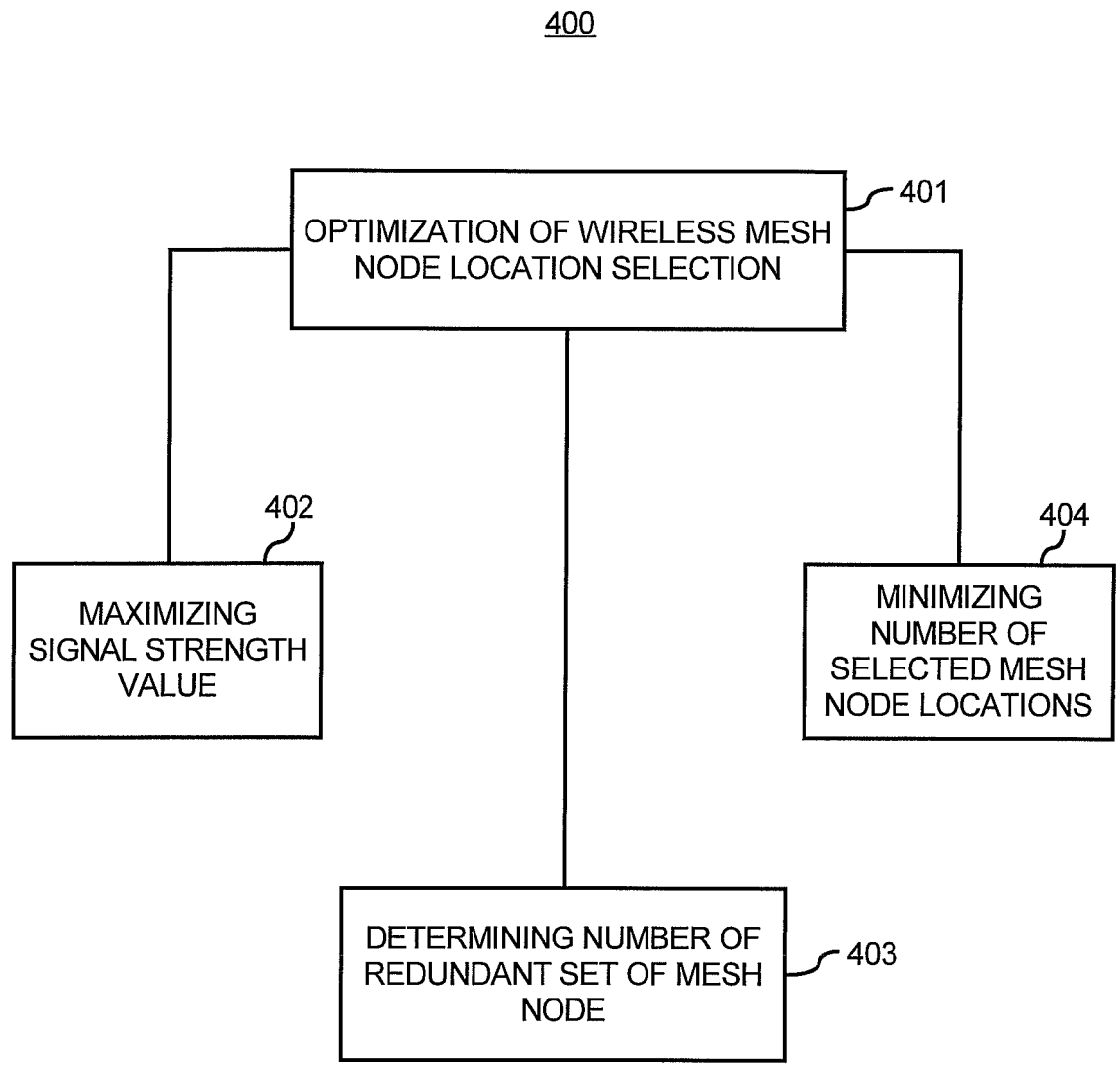
FIG. 4 shows optimizations of the wireless mesh nodes location selection based on the TST, according to an embodiment of the present invention.

FIG. 4 shows optimizations of the wireless mesh node location selection based on the TST, according to an embodiment of the present invention.

Optimizations of the wireless mesh node location selection 401 based on the TST includes maximizing the signal strength values over links of the network, determining a number of redundant set of mesh node that are connected to each of the client locations, and minimizing a number of selected mesh node locations based on the minimized wireless contention of the network.

To maximize the signal strength values over links of the network, the steps of determining the potential mesh node locations are repeated a predetermined number of times using the TST and a minimum signal strength value threshold is increased at each iteration until a cost of deploying wireless mesh nodes passes a predetermined level at a given signal strength value. After a first iteration of the steps of determining the potential mesh node locations, client locations that are connected to at least one mesh node are identified. Here, the connection to the client location should pass a predetermined threshold of the signal strength value. A number of redundant set of mesh node that are connected to each of the client locations are determined based on the identified client locations. To minimize a number of selected mesh node locations, contention values per links are assigned between two potential mesh nodes of the network as a number of the client location within a contention range of either end of the links and a wireless contention of the network is minimized by assigning contention values. The number of selected mesh node locations are minimized based on the minimized wireless contention of the network. Here, the assigned contention values per links preserves a triangle inequality.

FIG. 5 shows the block diagram of a computer system 500 that may be used as a platform for a device configured to select wireless mesh node locations for deploying a mesh node in a network. The computer system 500 may also be used to execute one or more computer programs performing the methods, steps and functions described herein. The computer programs are stored in computer storage mediums.

The computer system 500 includes a processor 520, providing an execution platform for executing software. The processor 520 is configured to select wireless mesh node locations for deploying a mesh node in the network. The processor 520 is further configured to determine an input graph and a TST that is formulated from the input graph and client locations in the wireless mesh network, to determine the Steiner nodes and the terminal vertices in the TST, to verify whether each of the client locations is connected to at least one of potential mesh node locations, to select arbitrary signal strength values between the client locations and the potential mesh nodes, and to select mesh node locations for deploying the mesh nodes from the Steiner nodes in the TST based on the arbitrary signal strength values and connectivity and coverage constraints. The input graph and the TST includes Steiner nodes, terminal vertices, and signal strength values, and the signal strength values are for pairs of mesh node-to-client location, and for pairs of mesh node-to-mesh node. The processor 520 is also configured to maximize the signal strength values over links of the network, to determine a number of redundant set of mesh node that are connected to each of the client locations, and to minimize a number of selected mesh node locations.

Commands and data from the processor 520 are communicated over a communication bus 530. The computer system 500 also includes a main memory 540, such as a Random Access Memory (RAM), where software may reside during runtime, and a secondary memory 550. The secondary memory 550 may include, for example, a nonvolatile memory where a copy of software is stored. In one example, the secondary memory 550 also includes ROM (read only memory), EPROM (erasable, programmable ROM), EEPROM (electrically erasable, programmable ROM), and other data storage devices, include hard disks. The main memory 540 as well as the secondary memory 550 may store the Steiner nodes, the terminal vertices, the signal strength values, the connectivity and coverage constraints, the client locations, the potential mesh node locations, and the selected mesh node locations as discussed before.

The computer system 500 includes I/O devices 560. The I/O devices may include a display and/or user interfaces comprising one or more I/O devices, such as a keyboard, a mouse, a stylus, speaker, and the like. A communication interface 580 is provided for communicating with other components. The communication interface 580 may be a wireless interface. The communication interface 580 may be a network interface. The communication interface 580 is configured to input information used to determine the input graph, the TST, the Steiner nodes, the terminal vertices, and the potential mesh node locations, to verify whether each of the client locations is connected to at least one of the potential mesh node locations, and to select the arbitrary signal strength values and the mesh node locations The communication interface 580 is also configured to input information used to maximize the signal strength values.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. At least one non-transitory computer readable storage medium storing instructions that when executed by a computer system performs a method for selecting wireless mesh node locations for deploying mesh nodes in a wireless network, the method comprising:
   determining an input graph, wherein the input graph includes signal strength values for a different measure of quality for pairs of mesh node-to-client location and mesh node-to-mesh node links;
   determining a Terminal Steiner tree (TST) that is formulated from the input graph and client locations in the wireless network, the TST including Steiner Nodes;
   selecting mesh node locations for deploying the mesh nodes from the Steiner nodes in the TST; and
   determining a number of redundant sets of mesh nodes connected to each of the client locations by repeating the step of determining the TST.

2. The at least one non-transitory computer readable storage medium of claim 1, wherein the TST includes Steiner nodes, terminal vertices, and the signal strength values.

3. The at least one non-transitory computer readable storage medium of claim 2, wherein the terminal vertices of the TST correspond to the client locations and the Steiner nodes of the TST corresponds to a potential mesh node locations of potential mesh nodes.

4. The at least one non-transitory computer readable storage medium of claim 3, wherein the method further comprises:
   selecting arbitrary signal strength values between the client locations and the potential mesh nodes, wherein the arbitrary signal strength values are selected from the signal strength values of the TST; and
   selecting mesh node locations includes selecting the mesh node locations based on the arbitrary signal strength values and connectivity and coverage constraints to deploy the mesh nodes.

5. The at least one non-transitory computer readable storage medium of claim 1, wherein the method further comprises:
   verifying whether each of the client locations is connected to at least one potential mesh node location.

6. The at least one non-transitory computer readable storage medium of claim 2, wherein the method further comprises:
   determining the Steiner nodes and the terminal vertices in the TST.

7. At least one non-transitory computer readable storage medium storing instructions that when executed by a computer system performs a method for selecting wireless mesh node locations for deploying mesh nodes in a wireless mesh network, the method comprising:
   determining an input graph, wherein the input graph includes signal strength values for a different measure of quality for pairs of mesh node-to-client location and mesh node-to-mesh node links;
   determining a Terminal Steiner tree (TST) that is formulated from the input graph and client locations in the wireless mesh network, wherein the TST includes Steiner nodes, terminal vertices, and the signal strength values;
   determining the Steiner nodes and the terminal vertices in the TST;
   verifying whether each of the client locations is connected to at least one of potential mesh node locations;
   selecting arbitrary signal strength values between the client locations and the potential mesh nodes, wherein the arbitrary signal strength values are selected from the signal strength values of the TST;
   selecting mesh node locations for deploying the mesh nodes from the Steiner nodes in the TST based on the arbitrary signal strength values and connectivity and coverage constraints; and
   for the client locations, determining redundant deployed mesh nodes for each client location.

8. The at least one non-transitory computer readable storage medium of claim 7, wherein the method further comprises:
   repeating the steps of determining the TST, determining the Steiner nodes, and determining potential mesh node locations until a set of potential mesh node locations are identified that maximize signal strength values between the client locations and mesh nodes deployed in the set of potential mesh node locations.

9. The at least one non-transitory computer readable storage medium of claim 7, wherein the selected mesh node locations minimize an amount of mesh nodes needed in the wireless mesh network to satisfy coverage and connectivity performance constraints.

10. The at least one non-transitory computer readable storage medium of claim 7, wherein the mesh nodes are selected to maximize a capacity gain of the network.

11. The at least one non-transitory computer readable storage medium of claim 7, wherein the wireless mesh node locations are geographical locations in the wireless mesh network.

12. The at least one non-transitory computer readable storage medium of claim 7, wherein the selected mesh node locations are constrained by coverage and connectivity constraints.

13. A computer system configured to select wireless mesh node locations for deploying mesh nodes in a wireless mesh network, the computer system comprising:
   a processor configured to determine an input graph and a Terminal Steiner tree (TST) that is formulated from the input graph and client locations in the wireless mesh network, wherein the input graph and the TST includes Steiner nodes, terminal vertices, and signal strength values, and the signal strength values are for a different measure of quality for pairs of mesh node-to-client location, and for pairs of mesh node-to-mesh node,
   wherein the processor is further configured to determine the Steiner nodes and the terminal vertices in the TST, to verify whether each of the client locations is connected to at least one of potential mesh node locations, to select arbitrary signal strength values between the client locations and the potential mesh nodes, and to select mesh node locations for deploying the mesh nodes from the Steiner nodes in the TST based on the arbitrary signal strength values and connectivity and coverage constraints,
   wherein the arbitrary signal strength values are selected from the signal strength values of the TST;
   an interface configured to input information used to determine the input graph, the TST, the Steiner nodes, and the terminal vertices, to verify whether each of the client locations is connected to at least one of the potential mesh node locations, and to select the arbitrary signal strength values and the mesh node locations; and
   a data storage storing the Steiner nodes, the terminal vertices, the signal strength values, the connectivity and coverage constraints, the client locations, the potential mesh node locations, and the selected mesh node locations.

14. The computer system of claim 13, wherein the processor is further configured to repeat the steps of determining the TST, determining the Steiner nodes, and determining potential mesh node locations until a set of potential mesh node locations are identified that maximize signal strength values between the client locations and mesh nodes deployed in the set of potential mesh node locations.

15. The computer system of claim 13, wherein the processor is further configured to determine redundant deployed mesh nodes for each client location.

16. The computer system of claim 13, wherein the terminal vertices of the TST correspond to the client locations and the Steiner node of the TST corresponds to the potential mesh node locations.

17. The computer system of claim 13, wherein the processor is further configured to maximize the signal strength values over links of the network.

18. The computer system of claim 13, wherein the processor is further configured to determine a number of redundant set of mesh nodes that are connected to each of the client locations.

19. The computer system of claim 13, wherein the processor is further configured to minimize a number of selected mesh node locations needed in the wireless mesh network to satisfy coverage and connectivity performance constraints.

* * * * *

UNITED STATES PATENT AND TRADEMARK OFFICE
CERTIFICATE OF CORRECTION

| | |
|---|---|
| PATENT NO. | : 8,228,912 B2 |
| APPLICATION NO. | : 12/433807 |
| DATED | : July 24, 2012 |
| INVENTOR(S) | : Joshua P. Robinson et al. |

It is certified that error appears in the above-identified patent and that said Letters Patent is hereby corrected as shown below:

In the Claims:

In column 9, line 27, in Claim 3, before "potential" delete "a".

In column 10, line 43, in Claim 13, delete "includes" and insert -- include --, therefor.

Signed and Sealed this
Twenty-eighth Day of May, 2013

Teresa Stanek Rea
*Acting Director of the United States Patent and Trademark Office*